March 10, 1953  R. G. LE TOURNEAU  2,630,638
BULLDOZING MACHINE

Filed Feb. 11, 1947  3 Sheets-Sheet 3

INVENTOR.
R. G. LeTourneau
BY
Webster & Webster
ATTYS

Patented Mar. 10, 1953

2,630,638

UNITED STATES PATENT OFFICE 2,630,638

BULLDOZING MACHINE

Robert G. Le Tourneau, Longview, Tex., assignor to R. G. Le Tourneau, Inc., Stockton, Calif., a corporation Application February 11, 1947, Serial No. 727,804

5 Claims. (Cl. 37—144)

This invention is directed to and it is an object to provide a heavy duty machine, especially designed for bulldozing, push grading, or scraper pusher loading operations, supported and propelled by a four-wheel drive vehicle wherein the wheels are fitted with pneumatic tires. The present implement is thus distinguished from bulldozers, as in current use, which consist of a crawler or endless track tractor primarily designed for drawbar operation but upon the front end of which tractor a transverse earth moving blade has been mounted. This type of tractor while powerful in operation is inherently very heavy and of relatively slow speed which, for many reasons, materially reduces its productive efficiency.

The primary object of the present invention is, therefore, to produce a bulldozing machine which will be as powerful and capable of performing the bulldozing and other allied operations as well or better than one in which the bulldozing element is mounted on a conventional track type tractor, but one which will have the speed comparable with that of a truck as distinguished from the inherently slow speed of such conventional tractor. In the accomplishment of this objective the invention further contemplates the mounting of the bulldozing element on a four wheeled vehicle in which all four wheels are in such driving relation with the prime mover of the vehicle that the vehicle will have a relatively light rolling resistance as distinguished from the heavy dragging resistance of the tracks of a track-type tractor. Such a driving relation will permit of easy gear changes since the easy rolling resistance accomplished thereby enables the vehicle to continue motion long enough for the operator to shift gears while the vehicle is still in motion. With the track type tractor it is impossible to shift from a low to a higher gear during the heavily loaded part of the working cycle, whereas with the present invention a shift of gears, either up or down, and either forwardly or reverse, may be made while the vehicle is in motion and without change of the power moment. This all makes for highly accelerated speed and efficiency in the performance of the bulldozing operation over that possible with previously used bulldozing machines.

Another object of this invention is to provide a bulldozing machine which includes a heavy, compact, rigid main frame supported on opposite sides by front and rear wheels disposed in longitudinally spaced but adjacent relation, an engine and transmission assembly on the frame connected in driving relation to the wheels, and a bulldozer blade unit mounted in connection with the frame with the blade in advance of the front wheels; all of the wheels being wholly unsprung and the relatively large pneumatic tires with which said wheels are fitted mainly absorb the road shock.

An additional object of the invention is to provide a bulldozing machine as above wherein the engine is mounted adjacent the rear of the main frame so as to impose the engine weight on the rear wheels of the machine, tending to counterbalance the weight and downward thrust of the bulldozer blade unit mounted forwardly on the machine, whereby when the machine is in operation relatively great and substantially equalized traction is had at all four of the wheels.

It is also an object of the invention to incorporate, in the engine and transmission assembly of the machine, a constant mesh transmission interposed between the engine and driven wheels whereby speed changes—forwardly or reverse—can be accomplished without stopping motion of the machine. This is important for the reason that if motion of the machine is stopped for speed changes it may well lose effective traction.

A further object of the invention is to provide novel adjustable mounts for the push beams of the bulldozer blade unit; such mounts being directly connected to the rigid main frame at relatively low points at the sides thereof intermediate adjacent front and rear wheels; such mounts being adjustable so as to dispose the bulldozer blade horizontally, or at a tilt transversely of the direction of travel, selectively.

A further object of the invention is to produce a practical, powerful, rugged and extremely mobile implement and one which will be exceedingly effective for the purpose for which it is designed.

These objects are accomplished by means of such structure and relative arrangement of parts as will fully appear by a perusal of the following specification and claims.

Figure 1:
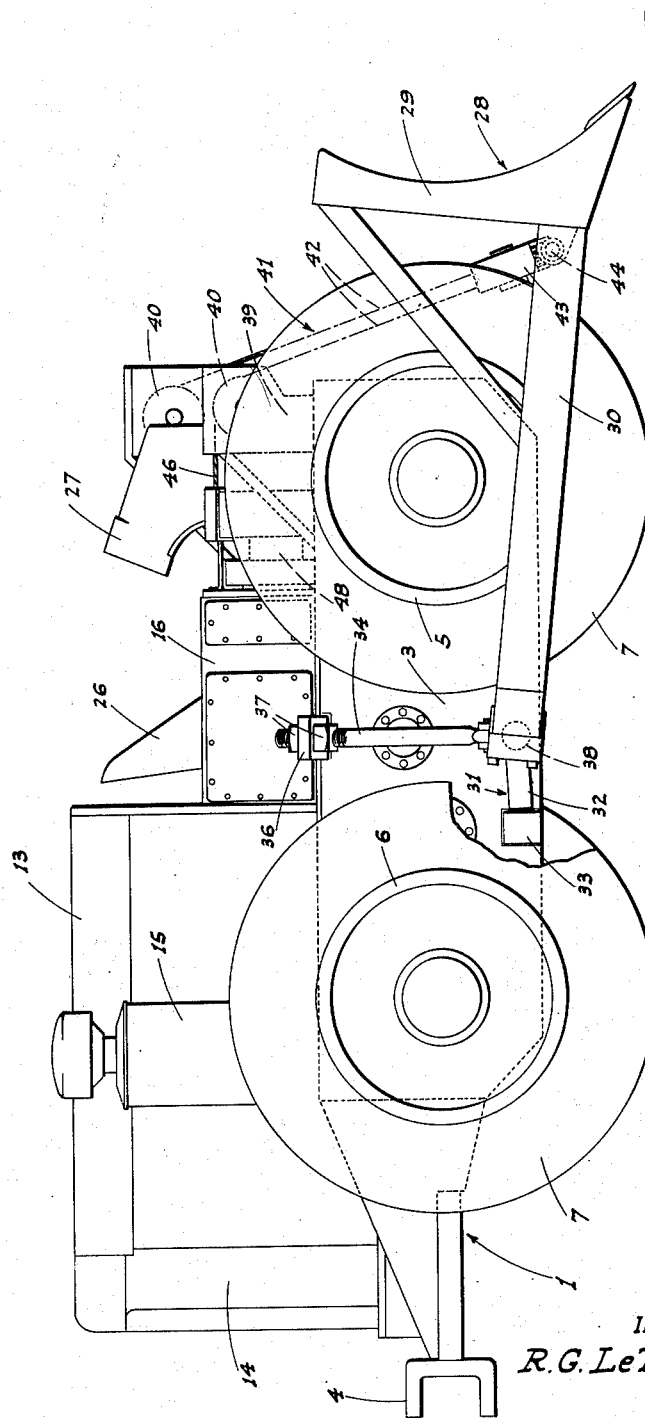
Figure 1 is a side elevation of the novel bulldozing machine.
Figure 2:
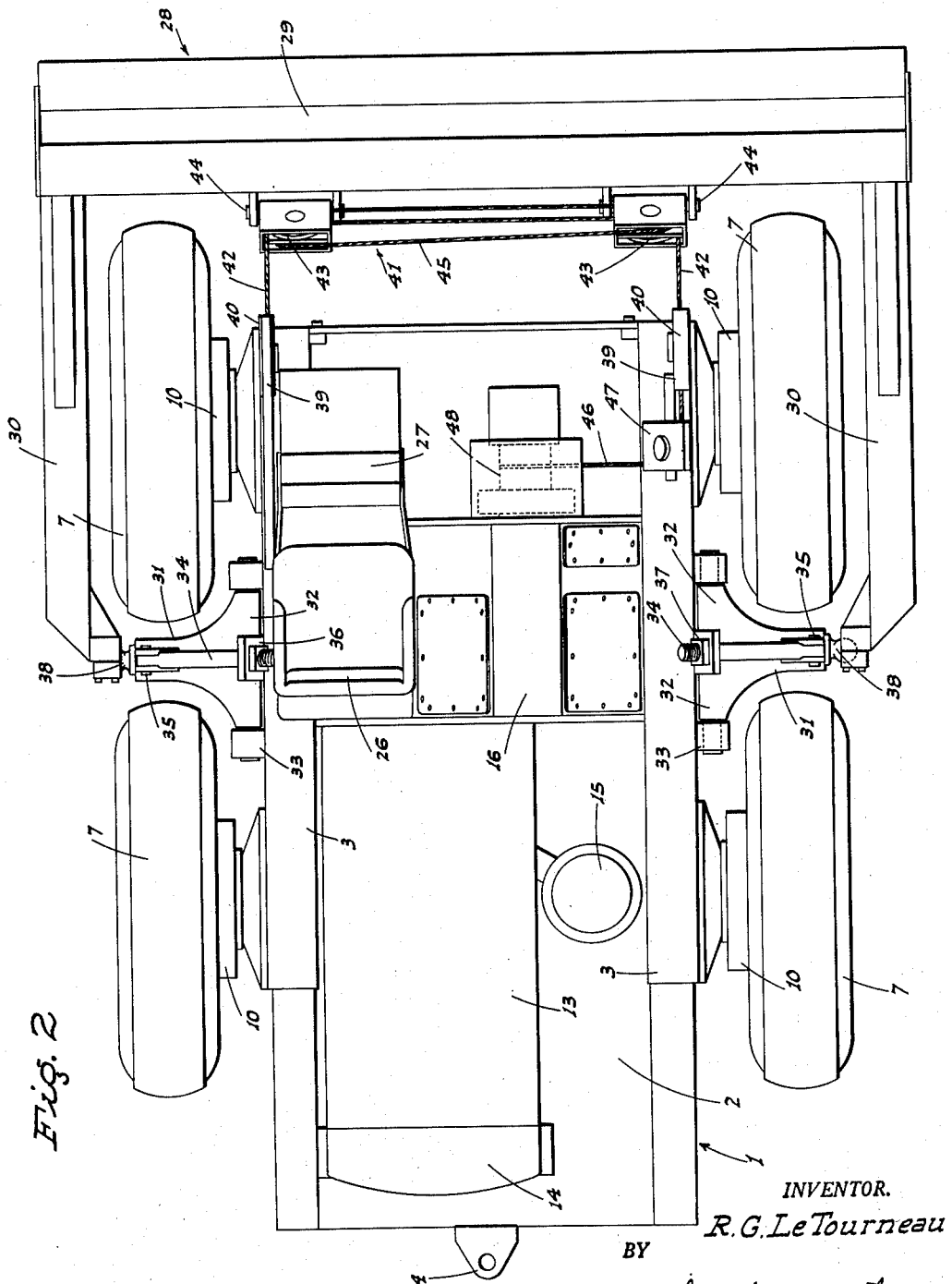
Figure 2 is a plan view of such machine.
Figure 3:
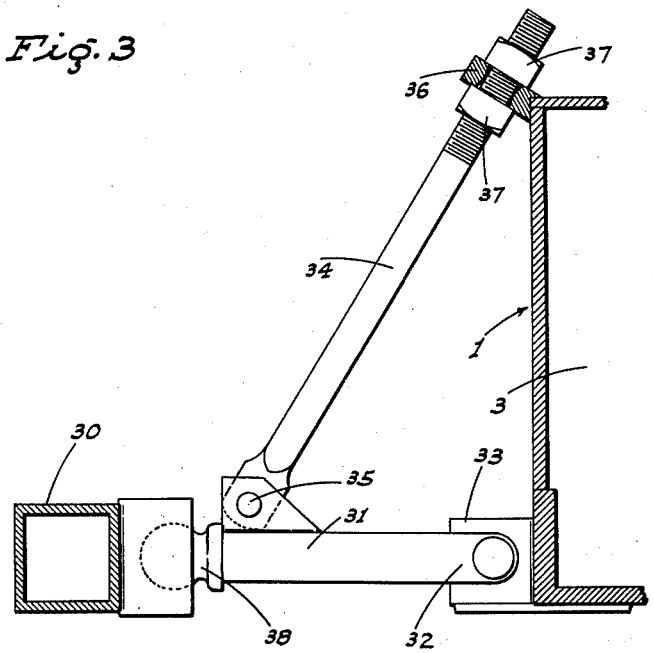
Figure 3 is an enlarged fragmentary transverse section showing one of the adjustable mounts for the push beams of the bulldozer blade unit.
Figure 4:
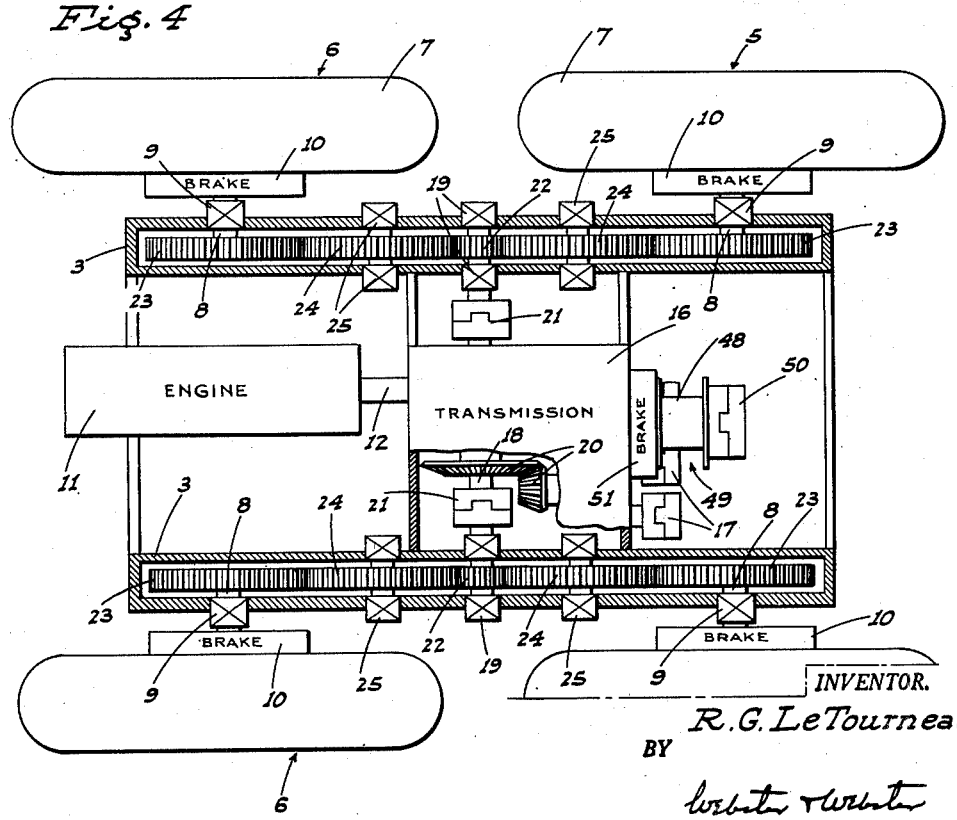
Figure 4 is a somewhat diagrammatic plan view of the machine illustrating particularly the drive assembly thereof.

Referring now more particularly to the characters of reference on the drawings, the bulldozing machine comprises a main frame 1 which is of rigid, weighty, heavy duty construction; such main frame being elongated, and substantially rectangular in plan. The main frame 1 includes a bed 2 having longitudinally extending, upstanding gear cases 3 formed along opposite sides thereof from the front end of said frame to a point adjacent but short of its rear end, at which rear end the frame is fitted with a towing hitch 4.

The machine is supported on opposite sides by front and rear wheels indicated at 5 and 6, respectively; adjacent front and rear wheels being disposed in alignment lengthwise of the machine in spaced but closely adjacent relation. The front and rear wheels of the machine are fitted with relatively large pneumatic tires 7, and such tires serving as the means to absorb road shock as the wheels are wholly unsprung as will hereinafter appear.

The front wheels 5 and rear wheels 6 each include a spindle 8 which projects inwardly into the adjacent gear case 3 through a bearing 9; the wheels being provided with brake units 10.

The front and rear wheels of the machine are driven by the following system:

A relatively high powered engine 11 is mounted on the main frame 1 at the rear end portion thereof; with the engine disposed lengthwise of the machine, and the main drive shaft 12 projecting forwardly. The engine 11 is enclosed within an engine hood 13 and a radiator grill 14 is disposed at the rear end of the hood 13; the engine radiator being carried within said grill. The numeral 15 indicates the air filter and intake unit of the engine.

From the engine 11 the main drive shaft 12 extends forwardly into driving relation with a transmission 16 mounted on the main frame 1 intermediate its ends; said transmission 16 being of constant mesh type including a plurality of change speed, and reversing, clutch units 17 projecting forwardly from and beyond the front wall of said transmission 16. The clutch units 17 are preferably of fluid pressure controlled type. The transmission and clutch unit assembly is shown in detail in application for United States Letters Patent, Serial No. 735,484, filed March 18, 1947, now Patent No. 2,553,376, granted May 15, 1951.

A main driven shaft 18 extends transversely of the main frame through the case of transmission 16, and projects at opposite ends through adjacent gear cases 3, being supported by bearings 19. The main driven shaft 18 is reversibly actuated from the transmission 16 through the medium of a bevel pinion and gear unit 20, and on opposite sides of said unit 20 the main driven shaft 18 has steering clutches 21 interposed therein.

In each gear case 3 the main driven shaft 18 is fitted with a driving pinion 22 and each spindle 8 includes a drive gear 23 thereon within the corresponding gear case 3. An intermediate gear 24 carried by bearings 25 runs in mesh between each drive gear 23 and the corresponding driving pinion 22. Thus driving pinion 22 drives a pair of intermediate gears 24 on opposite sides thereof and in turn said intermediate gears 24 drive corresponding gears 23 of the adjacent front and rear wheel spindles 8.

To one side of the transmission 16 the machine includes an operator's seat 26 disposed in facing relation to an upstanding cowl unit 27 which includes an instrument panel and control members (not shown).

The machine is fitted at its forward end with a bulldozer blade unit indicated generally at 28; such unit including a transverse bulldozer blade 29 having rearwardly projecting push beams 30 affixed thereto at opposite ends and extending rearwardly alongside the machine laterally outwardly of the front wheels 5. The push beams 30 terminate at their rear ends in a vertical transverse plane extending between the adjacent but spaced tires of the corresponding front and rear wheels. At such rear ends the push beams 30 are each vertically adjustably connected to the sides of the main frame 1 by adjustable mounts constructed as follows:

Each push beam mount comprises a T-shaped mounting arm 31 disposed with the T head 32 thereof adjacent and extending horizontally lengthwise of the corresponding side of the main frame 1, and is journaled at opposite ends in bosses or bearings 33 on the main frame 1. Each T-shaped arm 31 is thus mounted for vertical swinging adjustment and normally projects laterally outwardly in substantially centralized relation between the tires of the adjacent front and rear wheels.

Each T-shaped mounting arm 31 is normally maintained in rigid but vertically adjustable relation by an adjustment rod 34 which extends at an upwardly and inwardly incline from a pivotal connection 35 on the arm through a bracket 36 on the upper edge portion of the gear case 3. Adjustment nuts 37 are threaded on the upper end portion of each rod 34 on opposite sides of the bracket 36, whereby adjustment of such nuts effects longitudinal shifting of the rod 34 and corresponding vertical adjustment of the T-shaped mounting arm 31. The rear ends of the push beams 30 are coupled to the corresponding outer ends of the T-shaped mounting arms 31 by ball and socket units 38.

The following mechanism is employed to vertically adjustably suspend the bulldozer blade unit 28 from the forward end of the main frame 1;

At its front end the main frame 1 is provided with a suitable upstanding frame 39 having transversely spaced pulleys 40 mounted thereon. A cable, indicated generally at 41, includes drop leads 42 which extend downwardly from the pulleys 40 about swinging sheaves 43 pivoted, as at 44, to the transverse bulldozer blade 29 at the rear adjacent its bottom edge. From the swinging sheaves 43, which are of multiple pulley type, the cable 41 is reeved back and forth as at 45. After passing over the pulleys 40 at the top thereof the cable drop leads 42 are arranged with one dead-ended and the other extending as a pull lead 46 which leads about a direction changing sheave 47 and thence extends laterally inwardly to connection with the cable drum 48 of a winch unit indicated generally at 49.

The winch unit 49 is mounted on and extends forwardly from the front wall of the transmission 16 substantially centrally between the upstanding gear cases 3; such winch unit being driven from the transmission and including a clutch 50 and brake 51 controlled by the machine operator by mechanism not shown. When the winch unit 49 is operated in one direction or the other the bulldozer blade unit 28 is raised or lowered, respectively, by the described cable system and to the position as working conditions may require. In any given working position the transverse bulldozer blade 29 may be horizontally disposed by adjustment of the rods 34 to equal effective length. By adjusting said rods to different effective lengths, i. e. with a differential projection, the blade 29 may be tilted transversely of the direction of travel with one end or the other relatively raised.

When the described bulldozing machine is in operation it may be driven in a forward direction or a reverse direction at selective speeds by reason of the described engine transmission and drive gearing assembly, and speed changes can be accomplished without stopping motion of the machine for the reason that the transmission 16 is of constant mesh type. Speed changes, together with reverse of the direction of travel, are accomplished by control of the clutch units 17 and which control is effected, selectively, by the operator of the machine by mechanism not here shown.

To steer the machine the latter includes the steering clutches 21 similarly controlled by the machine operator. If the operator desires to turn to the right he disengages the corresponding steering clutch 21, and the front and rear wheels on the opposite side continue to turn under power causing the machine to circle to the right. Left turning is accomplished by a reverse operation, i. e. by disconnection of the left side steering clutch 21. To increase the sharpness of the turn in either direction a mechanism may be employed by which disengagement of one steering clutch permits of application of the brake units 10 only on the side of the machine corresponding to the disengaged clutch. Normally the brake units 10 are energized simultaneously under the control of the operator.

When operating, the bulldozing machine can exert a very great forward force, one of the reasons which attribute to this result being the substantial traction of the pneumatic tired wheels 5 and 6. This effective traction is obtained from the weight distribution of the machine in combination with the particular mounting of the bulldozer blade unit. By mounting the engine 11 on the rear end portion of the main frame 1 the weight of such engine is imposed, in the main, on the rear wheels 6 assuring of adequate traction thereof. When the machine is in forward motion, with the bulldozer blade unit 28 in operation, the reactive force of said bulldozer blade unit is imparted by the arms 31 as a thrust on the main frame at low points on opposite sides thereof but some distance ahead of the rear wheels urging the forward portion of the main frame and the front wheels downwardly, consequently increasing their traction. In other words, with the engine weight at the rear of the main frame, and with the bulldozer blade unit weight and thrust urging the forward end of said frame and the front wheels downwardly, the load of the machine is well distributed between the wheels thereof for maximum traction and stability.

The bulldozing machine, as described herein, provides a rugged multi-speed implement for bulldozing, push grading, or scraper pusher loading operations. By scraper pusher loading operations is meant the employment of the bulldozing machine to engage the rear end of an earth digging and carrying scraper to boost the latter during digging and loading thereof.

One of the features which gives advantage to the machine is the fact that the push beams are connected to such machine at the most rigid part thereof, i e. the main frame at low points on the sides thereof, as described, and intermediate its ends. By this mounting the load or thrust of the bulldozer blade unit is not directed to any part of the wheel assembly as on crawler tractors where the push beams couple to the track frame.

For scraper pusher loading operations the machine has advantage for the reason that it can travel multi-speed forwardly or reverse thus being capable of relatively high speed travel between pusher operations and relatively low speed, with great traction and force, for pushing scrapers to load the same. As the transmission 16 is of constant mesh type the speed changes can be made without stopping travel of the machine; this being another great advantage in connection with scraper pusher loading operations.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In the combination of a tractor having a frame and a bulldozer blade unit having transversely spaced push beams extending rearwardly along and spaced from opposite sides of the frame; an arm corresponding to each push beam pivoted for vertical swinging motion to and projecting laterally outward from the adjacent side of the frame, means coupling each push beam and corresponding arm, and means between the frame and each arm maintaining the latter in normally rigid but vertically adjustable relation.

2. A combination as in claim 1 in which said last named means comprises, for each arm, a longitudinally adjustable rod connected between the arm and frame on an inward and upward incline from said arm.

3. A combination as in claim 1 in which the arm is T-shaped in plan, the T head extending lengthwise of the frame and being journaled at opposite ends thereto.

4. A combination as in claim 1 in which the arm is T-shaped in plan, the T head extending lengthwise of the frame and being journaled at opposite ends thereto; said last named means comprising, for each arm, a longitudinally adjustable rod connected between the arm and frame on an inward and upward incline from said arm.

5. A bulldozing machine comprising a rigid unitary substantially rectangular main frame, unsprung front and rear wheel bearings mounted on the frame in rigid relation therewith, wheels journaled in said bearings, pneumatic tires mounted on the wheels, a power plant and transmission assembly mounted on the frame and connected in driving relation with all the wheels, the wheels being disposed laterally out from the sides of the frame and the wheels on each side of the frame, respectively, being in alinement longitudinally of the machine and having their peripheries lying closely adjacent each other, an arm mounted on each side of the frame and projecting laterally out therefrom between the peripheries of the adjacent wheels, a bulldozer blade disposed transversely of the front end of the frame closely adjacent the front wheels, push beams on the ends of the blades, such push beams extending rearwardly in planes laterally out from the front wheels and being connected at their rear ends with the outer ends of the arms for vertical swinging movement, and means on the frame and connected with the blade and being operative to swing the arms and blade vertically.

ROBERT G. LE TOURNEAU.

REFERENCES CITED

The following references are of record in the file of this patent:

UNITED STATES PATENTS

| Number | Name | Date |
| --- | --- | --- |
| 2,126,791 | Low | Aug. 16, 1938 |
| 2,197,248 | Bonham, Jr., et al. | Apr. 16, 1940 |
| 2,213,635 | Miller et al. | Sept. 3, 1940 |
| 2,238,346 | Sorensen | Apr. 15, 1941 |
| 2,352,593 | Allin | July 4, 1944 |
| 2,404,759 | Washbond | July 23, 1946 |
| 2,434,693 | Graham | Jan. 20, 1948 |
| 2,436,912 | Bonham, Jr. | Mar. 2, 1948 |
| 2,446,136 | Jarmin | July 27, 1948 |